(12) United States Patent
Sellers

(10) Patent No.: US 6,184,943 B1
(45) Date of Patent: Feb. 6, 2001

(54) PORTABLE COMPUTER SYSTEM INCORPORATING A REAR PROJECTION DISPLAY

(75) Inventor: Charles A. Sellers, Houston, TX (US)

(73) Assignee: Compaq Computer Corporation, Houston, TX (US)

( * ) Notice: Under 35 U.S.C. 154(b), the term of this patent shall be extended for 0 days.

(21) Appl. No.: 09/012,279

(22) Filed: Jan. 23, 1998

(51) Int. Cl.$^7$ ........................................... H04N 5/74
(52) U.S. Cl. ..................... 348/744; 348/745; 348/746; 348/790; 348/838; 345/87; 345/905; 353/122; 353/DIG. 5; 364/231.1
(58) Field of Search ..................... 348/744, 745, 348/755, 756, 790, 836, 838, 904; 345/87, 905; 353/102, 122, DIG. 5, DIG. 3, 120, 119; 364/231.1, 708.1

(56) References Cited

U.S. PATENT DOCUMENTS

| | | | |
|---|---|---|---|
| 4,832,419 | * 5/1989 | Mitchell et al. | 361/681 |
| 4,917,465 | * 4/1990 | Conner et al. | 350/335 |
| 5,283,862 | * 2/1994 | Lund | 345/173 |
| 5,353,075 | * 10/1994 | Conner et al. | 353/122 |
| 5,471,674 | * 11/1995 | Stewart et al. | 395/652 |
| 5,768,095 | * 6/1998 | Nakamura et al. | 361/681 |
| 5,814,924 | * 9/1998 | Komatsu | 313/309 |
| 5,865,522 | * 2/1999 | Gold | 353/102 |
| 5,896,119 | * 4/1999 | Evanicky et al. | 345/87 |
| 5,896,575 | * 4/1999 | Higginbothham et al. | 455/566 |

OTHER PUBLICATIONS

Holton, W. Conrad, *Light–emitting polymers: Increasing promise*, May 1997, p. 163–164, 166, 169, Solid State Technology, Technology Topic, Flat Panel Displays.

Striegler, Thomas D., *AsiaFocus—The Asian LCD Market*, May 1997, pp. 62 and 64, Solid State Technology.

Ajluni, Cheryl, *SID Conference Highlights The Road To Invention*, May 12, 1997, pp. 39–40, 42, 44 and 46, Electronic Design, Tech Insights—Exploring the world of information display technology.

Hara, Yoshiko, *Japan vendors give color to reflective display at SID*, May 12, 1997, pp. 10 and 14, Electronic Engineering Times.

Clarke, Peter, *Startup claims efficiency breakthrough at SID—LCD advance comes to light*, May 19, 1997, pp. 22 and 140, Electronic Engineering Times.

* cited by examiner

Primary Examiner—John K. Peng
Assistant Examiner—Jean W. Désir
(74) Attorney, Agent, or Firm—Akin, Gump, Strauss, Hauer & Feld, LLP

(57) ABSTRACT

A portable computer system incorporating a rear projection display. The rear projection display is housed in a display enclosure that is movable between an open and closed position, and incorporates either a pliable or deformable projection surface or a projection surface formed of multiple rigid components. When the display enclosure is open, the projection surface is configured to expand beyond the form factor dimensions of the base portion of the portable computer. In the preferred embodiment of the invention, the projection surface is a pliable material that can be safely deformed or collapsed within the display enclosure when it is closed. The rear projection display thereby allows the effective viewing area of a portable computer display to be increased without negatively impacting the form factor dimensions or weight of the portable computer.

7 Claims, 5 Drawing Sheets

PORTABLE COMPUTER SYSTEM INCORPORATING A REAR PROJECTION DISPLAY

BACKGROUND OF THE INVENTION

1. Field of the Invention

The invention relates to displays and portable computers, and more particularly to a portable computer system incorporating a rear projected display apparatus to increase the effective viewing area of the display without negatively impacting the form factor of the portable computer.

2. Description of the Related Art

Portable computers have become an everyday fixture in many people's personal and professional lives. Due to their mobility and versatility, portable computers are even beginning to displace desktop computers in many offices. Despite the fact that the average display size in portable computers has increased over the years, however, screen sizes remain too small for many applications requiring a large viewing area. More specifically, today's portable computers often include displays ranging from 10.4-inches to 12.1-inches. Many computer users accustomed to working with large desktop CRT monitors perceive these smaller portable computer displays as being inadequate.

Somewhat larger screens for portable computers have been developed. However, displays cannot be made arbitrarily large. The effective size limit for today's display technologies is restricted by numerous practical and technical limitations. For example, the weight added to a portable computer by increasing its display size may be undesirable, and is often a major consideration. The form factor specifications of a portable computer, and particularly the width and length dimensions of the base portion, may also impose size limitations on the display. Further, problems in the manufacturing process, including problems with defects and poor yields, make larger displays much more expensive to produce. These manufacturing problems are inherent and arise from basic design of traditional displays, such as the active-matrix (AM) or thin-film-transistor (TFT) liquid crystal displays (LCDs).

Such displays may incorporate hundreds of thousands of transparent transistors driving a grid of electrical traces to control operation of liquid crystal fluid structure to generate images. As the size and resolution of a display increases, more transistors are required. More transistors increases the likelihood of defects, which often render the display useless. Similar manufacturing problems plague other imaging technologies, such as polymer dispersed liquid crystal displays (PDLCDs) and field emission displays (FEDs). As a result, display manufacturers often focus on improving image quality and reducing the power-consumption and weight of portable displays, rather than increasing display area.

SUMMARY OF THE INVENTION

A portable computer system according to the present invention consists of a base portion and a rear projection display. The rear projection display is housed in a display enclosure that is movable between an open position and a closed position, and incorporates a deformable projection surface. When the display enclosure is opened, the projection surface is configured to expand beyond the form factor dimensions of the base portion of the portable computer. Preferably, the projection surface is a pliable material that can be safely deformed or collapsed within the projection display enclosure when closed.

In addition to the projection surface, the rear projection display is comprised of an image generator/source or display panel and an optical system for projecting an image from the image generator onto the projection surface. When the projection display enclosure is in an open position, its components are separated by a distance sufficient to allow proper orientation and operation of the optical system. A rear projected display according to the invention thereby permits viewing angles and clarity comparable to that of many traditional display technologies.

In one embodiment of the invention, expansion of the projection surface is optional, affording a smaller viewing area when the portable computer is operated in tight spaces. In another embodiment of the invention, the projection surface is approximately the size of a traditional portable computer display, but the image generator or display panel is smaller, lighter and less costly.

Thus, a rear projection display according to the present invention allows the effective viewing area of a portable computer display to be increased without negatively impacting the form factor dimensions, cost or weight of the portable computer.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
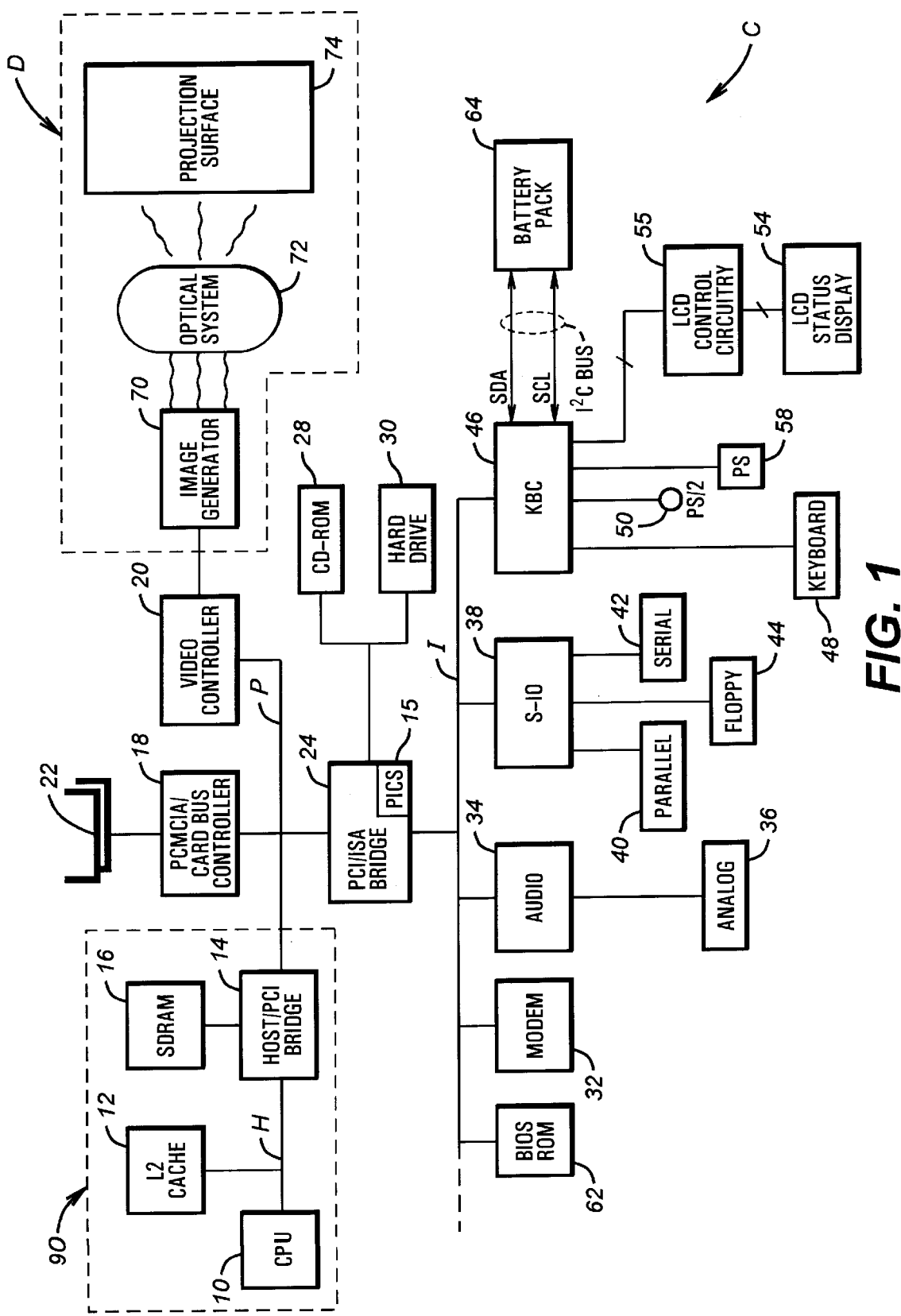
FIG. 1 is a schematic block diagram of a portable computer system incorporating a rear projection display according to the present invention.

Turning now to the drawings, a schematic circuit diagram of a portable computer system C incorporating a rear projection display D according to the present invention is shown. In the preferred embodiment, the computer system C incorporates two primary buses: a Peripheral Component Interconnect (PCI) bus P which includes an address/data portion and a control signal portion; and an Industry Standard Architecture (ISA) bus I which includes an address, portion, a data portion, and a control signal portion. The PCI and ISA buses P and I form the architectural backbone of the computer system C.

A CPU/memory subsystem 90 is connected to the PCI bus P. The CPU 10 and a Level 2 (L2) cache 12 are connected via a processor or host bus H. The CPU 10 preferably operates with a standard IBM-PC compatible operating system, such as Windows 95□. The L2 cache 12 provides caching capabilities that augment the on-chip cache of the CPU 10 to improve the overall performance of the computer system C.

The CPU 10 and the L2 cache 12 are connected to a Host/PCI bridge 14. Synchronous DRAM (SDRAM) 16 is also connected to the Host/PCI bridge 14. The host/PCI bridge 14 functions to couple the CPU/memory subsystem 90 to the PCI bus P. A PCMCIA/CardBus controller 18 is coupled to the PCI bus P, providing connection capabilities for a PCMCIA cards 22. The PCMCIA cards 22 can incorporate a variety of peripheral devices, expanding the versatility of the portable computer system C.

A PCI/ISA bridge 24 is used to connect the PCI bus P and an ISA bus I. The PCI/ISA bride 24 is used to convert signals between the PCI bus P and the ISA bus 1. The PCI/ISA bridge 24 includes: address and data buffers, arbitration and bus master control logic for the PCI bus P, ISA arbitration circuitry, an ISA bus controller as conventionally used in ISA systems, an IDE (intelligent drive electronics) interface 26, and a DMA controller. A hard disk drive 30 and a CD-ROM drive 28 are connected to the IDE interface 26 of the PCI/ISA bridge 24. Tape drives or other peripheral devices (not shown) can be similarly connected. The IDE interface 26 is an IDE/ATA interface capable of being a busmaster and incorporating enhanced IDE features. The CD-ROM drive 28 is preferably compliant with ATAPI (AT Attachment Packet Interface), the IDE standard for CD-ROM drives.

The PCI/ISA bridge 24 contains a set of programmable interrupt controllers (PICs) 15 for managing hardware interrupts according to their priority. The PICs 15 preferably include two cascaded PICs for enabling interrupts IRQ0/IRQ15. In the disclosed embodiment, the PCI/ISA bridge 24 also includes miscellaneous system logic. This miscellaneous system logic contains counters and activity timers as conventionally present in personal computer systems, an interrupt controller for both the PCI and ISA buses P and I, and power management logic. Additionally, the miscellaneous system logic may include circuitry for a security management system used for password verification and to allow access to protected resources. Preferably, the PCI/ISA bridge 24 is a single integrated circuit, but other combinations are possible.

Numerous other devices are coupled to the ISA bus I. These devices include a modem 32 and an audio chip 34. The audio chip 34 is further coupled to a device 36 for outputting analog signals, such as a set of speakers of the computer system C or an external stereo system. In the case of speakers, they are preferably configured to be audible while the rear projection display D of the computer system C is in a closed state. Also, a combination input/output (S-IO) chip 38 is coupled to the ISA bus I. The S-IO chip 38 incorporates various functions, such as a real-time clock, UARTs, a floppy disk controller for controlling a floppy disk drive 44, various address decode logic and security logic to control access to an internal or external CMOS/NVRAM memory (not shown) and stored password values. Further, the S-IO chip 38 provides a parallel port 40 and a serial port 42. To more clearly illustrate the features and operation of the present invention, certain other conventional computer devices and systems have been omitted from FIG. 1.

A keyboard controller 46 is also coupled to the ISA bus I. The keyboard controller 46 provides connections for a keyboard 48, a PS/2 port 50 and a power switch 58. The keyboard controller 46 also generates a data signal LCD__DATA and a clock signal LCD__CLK for use by LCD control circuitry 55. The LCD control circuitry 55 provides control signals for the LCD status display 54.

The portable computer system C is capable of both receiving power from and supplying power to a battery pack 64. A battery microcontroller (not shown) is incorporated in the battery pack 64 to provide supervisory functions for controlling the charging and discharging of the battery pack□s power cells. Preferably, the keyboard controller 46 communicates with the battery microcontroller via a standard I2C-bus. The inter-integrated circuit (IC) or I2C-bus is a simple bi-directional two wire bus developed for efficient inter-IC control. Details of the I2C-bus can be found in □The I2C-bus and How to Use It (Including Specification),□ published by Phillips Semiconductor.

A video controller circuitry 20 is also connected to the PCI bus P. The video controller 20 controller circuitry incorporates video memory and the necessary analog circuitry for controlling an image generator or display panel 70 in the rear projection display D. In the disclosed embodiment of the invention, the image generator 70 generates images for display on a projection surface 74. An optical system 72 is disposed between the image generator 70 and the projection surface 74 to focus images generated by the image generator 70 onto the projection surface 74. Depending on the configuration of the optical system 72, the video controller circuitry 20 may need to perform pre-processing steps on control signals to the image generator 70 to account for any issues arising due to image quality and distortions.

It is contemplated that the image generator 70 could be implemented in a variety of technologies. Such technologies include certain liquid crystal displays (LCDs) and field emission displays (FEDs), or other display devices using emissive image generating techniques. Other suitable projection display technologies could also be used. Further, the optical system 72 contains optical component(s) that are preferably constructed of a lightweight material having suitable optical properties.

Figure 2:
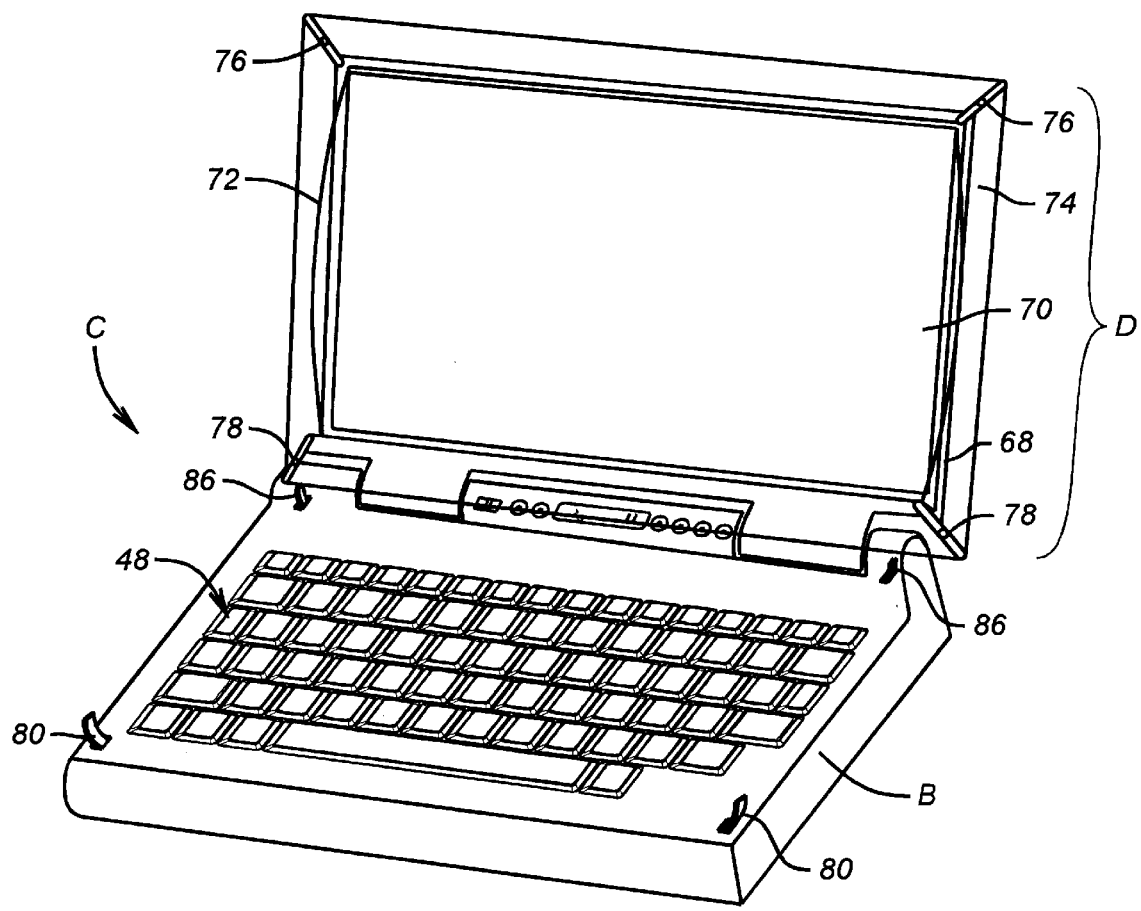
FIG. 2 is an isometric view of a portable computer system incorporating a rear projection display in accordance with the present invention.
Figure 5:
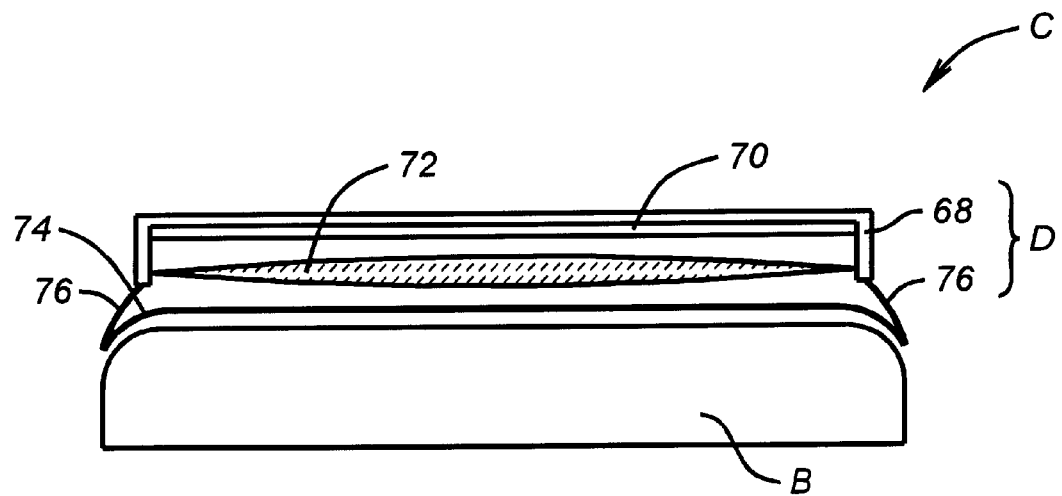
FIG. 5 is a front elevation view taken in cross-section of a rear projection display utilizing a one-piece deformable projection surface according to the present invention.

Referring now to FIG. 2, an isometric view of a portable computer system C incorporating a rear projection display D in accordance with the present invention is shown. The disclosed portable computer system C includes a base portion B pivotally coupled to the rear projection display D portion. As noted, the rear projection display D includes the image generator 70, the optical system 72, the projection surface 74. The various components of the rear projection display D are integral with or attached to a display enclosure 68. The display enclosure 68 is movable between an open position (as shown in FIG. 2) and a closed position (FIG. 5).

Figure 3:
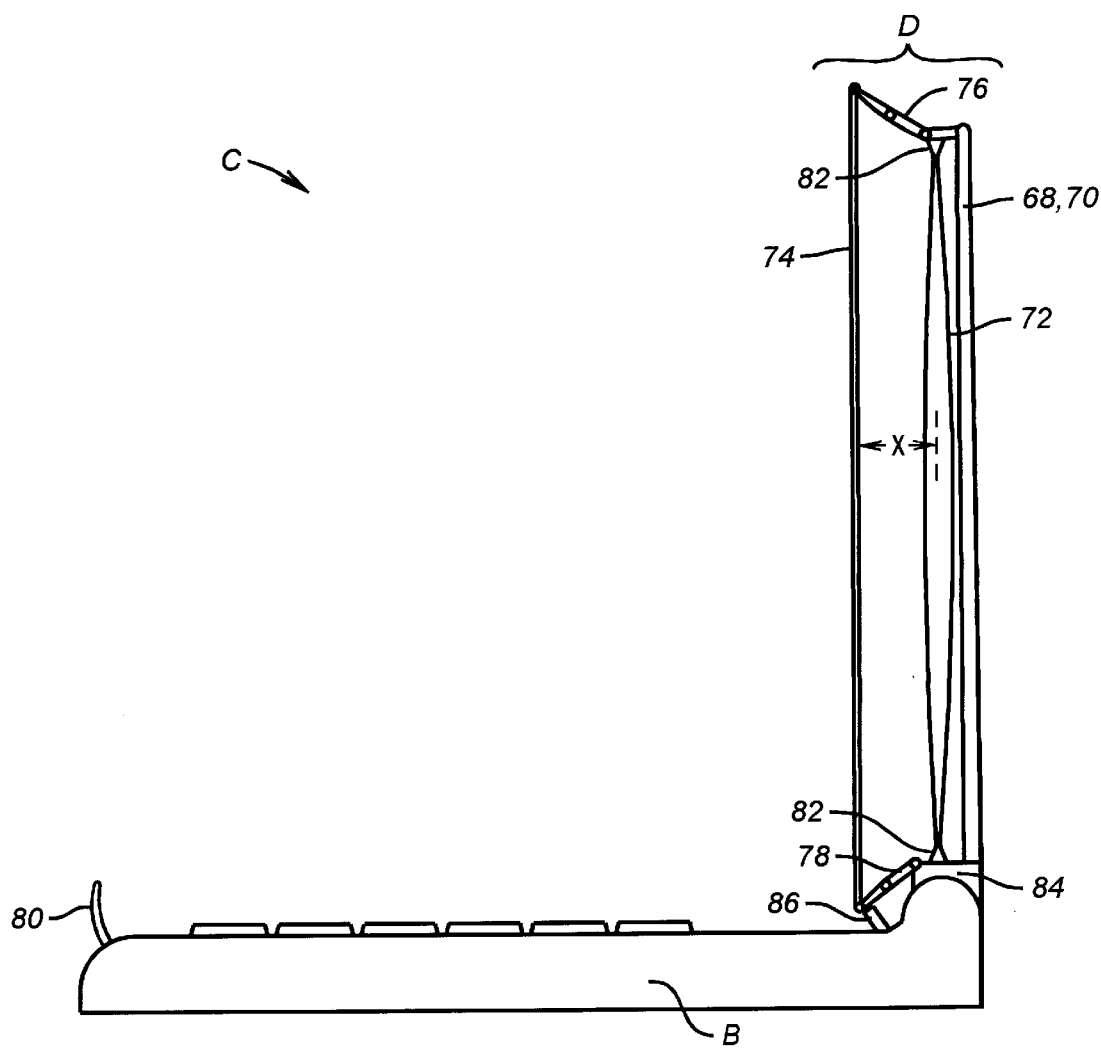
FIGS. 3 and 4 are side elevation views of alternate embodiments of a portable computer system incorporating a rear projection display according to the present invention.
Figure 4:
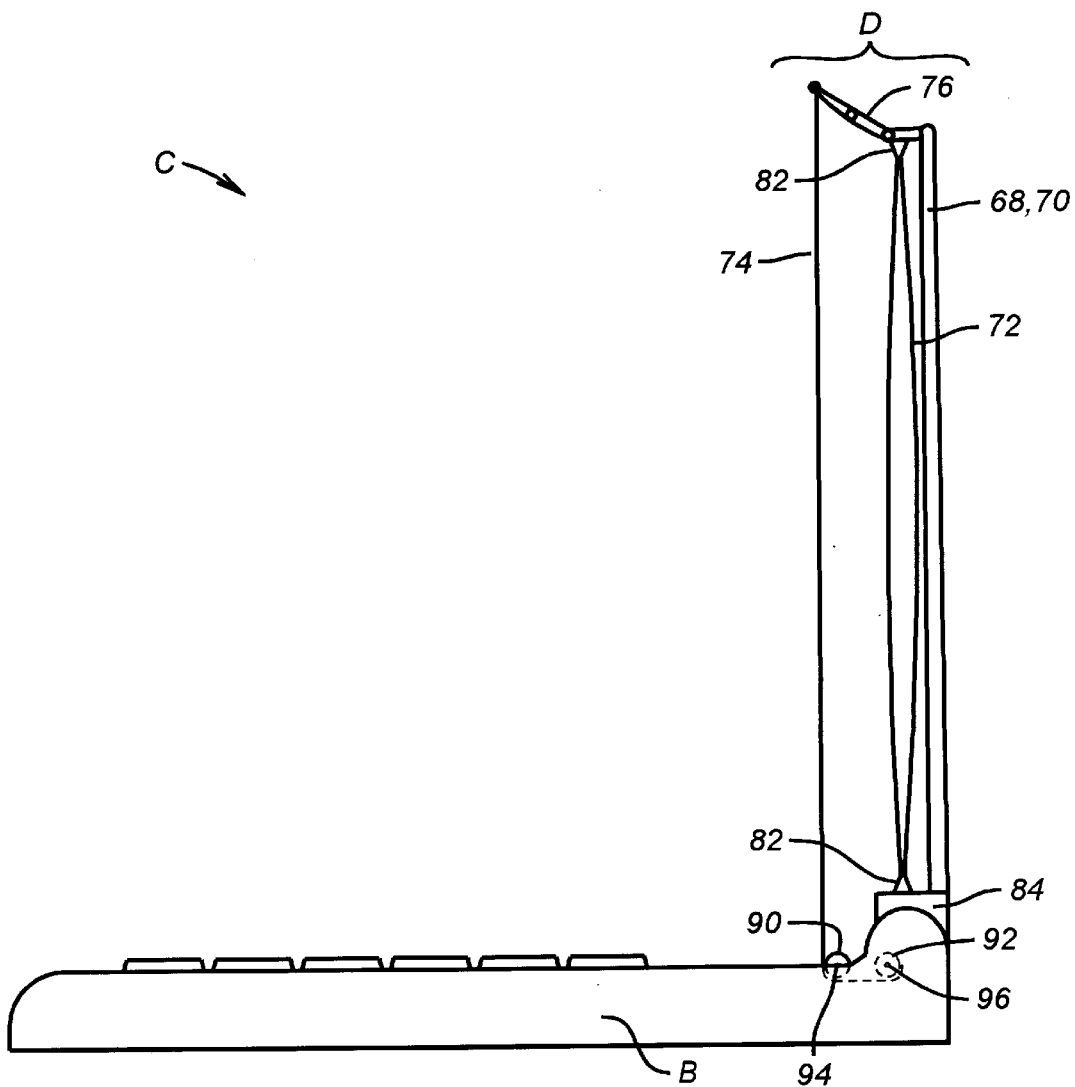

In the disclosed embodiments of the invention, the optical system 72 is comprised of a convex lens disposed between the image generator 70 and the projection surface 74 (as is seen more clearly in FIGS. 3 and 4). Any such lens components of the optical system 72 are preferably formed of a lightweight material having the necessary refraction and magnification properties.

The projection surface 74 is attached to the display enclosure 68 via a top pair of hinged or resilient attachment arms or mounting members 76 and a bottom pair of hinged or resilient attachment arms or mounting members 78. When the display enclosure 68 is in an open position as shown in FIG. 2, the projection surface 74 is configured to have an expanded surface area that exceeds the effective display area of the image generator 70. Preferably, the projection surface 74 is formed of a pliable material that can be safely deformed or collapsed within the projection display enclosure 68 when it is in a closed position. By expanding in this manner, the projection surface 74 allows the effective viewing area of the rear projection display D to exceed the viewing area of prior displays without negatively impacting the overall size of the portable computer system C.

The top and bottom pair of hinged or resilient attachment arms or mounting members 76 and 78 are preferably spring-loaded or otherwise biased to unfold or expand the deformable projection surface 74 when the display enclosure 68 is in an open position. When the display enclosure 68 is closed, a pair of retractable hooking members 80 operates to cause mounting members 76 to move from an extended position and to collapse the top portion of the projection surface 74, while a pair of rear stubs 86 are utilized cause mounting members 78 to retract to facilitate collapsing of the bottom portion of the projection surface 74. The projection surface 74 can also function to protect the optical system 72 from abrasions when the rear projection display D is in a closed position. It is noted that the manner of collapsing the projection surface 74 when the display enclosure 68 is in a closed position is not considered critical to the invention, and many alternate embodiments are suitable for use with the present invention.

Referring now to FIG. 3, a side elevation view of the portable computer system C of FIG. 2 is shown. As more clearly illustrated, when the display enclosure 68 is in an open position, the various components of the rear projection display D are separated by distances sufficient to allow the proper orientation and operation of the optical system 72. More particularly, the distance X separating the image generator 68 and the projection surface 74 depends to a large extent on the desired size of the viewing area provided by the rear projection display D, as well as the configuration of the optical system 72. As can be appreciated, image quality may also be affected by the distance separating the optical system 72 and the projection surface 74, and may need enhancement (e.g., a higher resolution and/or brighter image generator 68) if the distance becomes too large.

The display enclosure 68 includes a bottom portion or base 84 containing a connector or pivot member (not shown) used to pivotally couple the rear projection display to the base portion B of the portable computer system C. In addition to providing support for the remaining portions of the display enclosure 68 and the integral image generator 70, the base 84 of the display enclosure 68 also includes attachment points 82 for rigidly supporting the lens of the optical system 72. An optional polarizing filter (not illustrated) may also be disposed either between the image generator 70 and the optical system 72 or between the optical system 72 and the projection surface 74. The polarizing filter may improve the image quality of the rear projection display under certain ambient conditions.

It is also contemplated that the projection surface 74 can be optionally configured to collapse when the display enclosure 68 is in the opened position, thereby affording a smaller viewing area when the portable computer system C is operated in tight spaces that do not permit an increased viewing area. Further, it is contemplated that the image generator 70, the optical system 72 and the projection surface 74 can be reduced in size such that the viewing area provided by the projection surface 74 is comparable to that of existing portable computer displays. This embodiment of the invention has the advantage of allowing use of a smaller image generator 70, which may function to reduce both overall cost and weight of the portable computer system C.

Referring now to FIG. 4, a side elevation view of an alternate embodiment of a rear projection display according to the present invention is shown. In this embodiment of the invention, the retractable hooking members 80 and rear stubs 86 are replaced by a roller assembly comprised of the guide roller 90 and a primary roller 92. The guide roller 90 is secured to the base portion B via a pin 94, while the primary roller 92 is secured to the base portion B via a pin 96. The primary roller 92 is preferably spring-loaded, such that it stores a retractable spool or portion of the projection surface 74 when the display enclosure 68 is in a closed position. Preferably, the spring tension of the primary roller 92 can be selectively applied such that closure of the display enclosure 68 activates the primary roller 92 in a manner sufficient to overcome the tension provided by the top pair of hinged or resilient attachment members 76. The tension provided by the primary roller 92 can be relaxed when the display enclosure 68 is moved to an open position as shown in FIG. 4, such that the tension provided by the top pair of hinged or resilient attachment members 76 is sufficient to expand the projection surface 74 into an extended or taut position. Again, many other mechanical apparatus for expanding and retracting the deformable projection surface 74 are suitable for use with the present invention.

Referring now to FIG. 5, a front elevation view taken in cross-section of a rear projection display utilizing a one-piece deformable projection surface 74 in accordance with the present invention is shown. In this embodiment of the invention, the projection surface 74 is shown in a compressed (i.e., the rear projection display D is in a closed state). The projection surface 74 roughly conforms to the contour of the base portion B of the portable computer system C via pressure applied by the hinged or resilient attachment members 76 (and 78). Alternatively, the projection surface 74 could be expanded and contracted manually.

Figure 6:
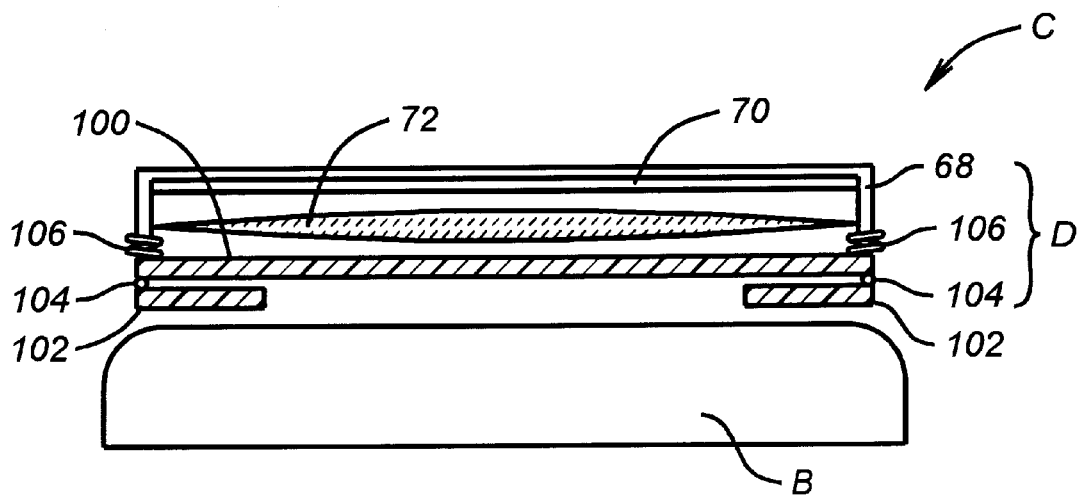
FIG. 6 is a front elevation view taken in cross-section of a rear projection display according to the invention having a projection surface formed of a plurality of substantially rigid portions.

Referring now to FIG. 6, front elevation view taken in cross-section of another embodiment of a rear projection display according to the present invention is shown. In this embodiment of the invention, the projection surface is formed of a substantially rigid main display panel 100, as well as two substantially rigid ancillary display panels 102. The ancillary panels 102 are connected to the main display panel by hinges 104. The ancillary display panels 102 are shown in a folded or collapsed state, and are rotatable about hinges 104 to become substantially co-planar with the main display panel 100, thereby forming a larger display area when the rear projection display D is in an opened state. The hinges 104 may be spring-loaded, or may operate manually. Preferably, the hinge(s) 104 attaching an individual one of the ancillary display panels 102 are located near the top and bottom edges of the ancillary display panels 102 such that they do not substantially impair the images provided on the display panels 100 and 102.

Further, in order to maintain proper spacing between the various components of the rear projection display D of FIG. 6, the display enclosure 68 may incorporate compressible portions 106 which attach to the main display panel 100 at its top and/or bottom edges. The compressible portions 106 function to extend the main display panel 100 and the ancillary display panels 102 away from the optical system 72 when the rear projection display D is in an open and operable position.

As evident from the foregoing, a portable computer system display according to the present invention may take the form of various embodiments of a rear projection display. The rear projection display is housed in a display enclosure that is movable between an open and closed position, and incorporates either a pliable or deformable projection surface or a projection surface formed of multiple rigid components. When the display enclosure is open, the projection surface is configured to expand beyond the form factor dimensions of the base portion of the portable computer. In the preferred embodiment of the invention, the projection surface is a pliable material that can be safely deformed or collapsed within the display enclosure when it is closed.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A portable computer system, comprising:
   a base portion having a top surface; and
   a projection display coupled to the base portion and movable between an open position and a closed position with respect to the base portion, the projection display comprising:
   an image generator for generating images;
   a projection surface for displaying images generated by the image generator, wherein the projection surface is formed of a pliable material, the pliable material capable of being expanded to have a surface area greater than the display area of the image generator when the projection display is in an open position; and
   an optical system disposed between the image generator and the projection surface, the optical system configured to discernably focus images generated by the image generator onto the projection surface.

2. A portable computer system, comprising:
   a base portion having a top surface; and
   a projection display coupled to the base portion and movable between an open position and a closed position with respect to the base portion, the projection display comprising:
   an image generator for generating images;
   a projection surface for displaying images generated by the image generator; and
   an optical system disposed between the image generator and the projection surface the optical system configured to discernably focus images generated by the image generator onto the projection surface, wherein the projection surface is formed of a plurality of rigid panels, and wherein the rigid panels comprise a main display panel and two ancillary display panels, the two ancillary display panels coupled to the main display panel and movable with respect to the main display panel between a folded position and a substantially coplanar position.

3. The portable computer system of claim 2, further comprising:
   a display enclosure, the image generator and optical system being integral with or rigidly coupled to the display enclosure; and
   resilient attachment members, wherein the projection surface is attached to the display enclosure via the resilient attachment members.

4. The portable computer system of claim 3, further comprising:
   a display enclosure, the image generator and optical system being integral with or rigidly coupled to the display enclosure; and
   hinged attachment members, wherein the projection surface is attached to the display enclosure via the hinged attachment members.

5. A portable computer system, comprising:
   a base portion having a top surface;
   a projection display coupled to the base portion and movable between an open position and a closed position with respect to the base portion, the projection display comprising:
   an image generator for generating images;
   a projection surface for displaying images generated by the image generator; and
   an optical system disposed between the image generator and the projection surface, the optical system configured to discernably focus images generated by the image generator onto the projection surface; and
   means for collapsing the projection surface when the projection display is moved to a closed position, wherein the means for collapsing the projection surface comprises retractable hooking members.

6. A projection display for attachment to a base portion of a portable computer system, the projection display comprising:
   an image generator for generating images;
   a projection surface for displaying images generated by the image generator, wherein the projection surface is formed of a pliable material, the pliable material, when taut, having a surface area greater than the display area of the image generator; and
   an optical system disposed between the image generator and the projection surface, the optical system configured to discernably focus images generated by the image generator onto the projection surface.

7. A projection display for attachment to a base portion of a portable computer system, the projection display comprising:
   an image generator for generating images;
   a projection surface for displaying images generated by the image generator, wherein the projection surface is formed of a plurality of rigid panels, and wherein the rigid panels comprise a main display panel and two ancilliary display panels, the two ancilliary display panels coupled to the main display panel and movable with respect to the main display panel between a folded position and a substantially coplanar position; and
   an optical system disposed between the image generator and the projection surface, the optical system configured to discernably focus images generated by the image generator onto the projection surface.

* * * * *